S. M. RENNIE.

Assignor of one-half Interest to W. J. Rennie.

DUST-PANS.

No. 7,866. Reissued Aug. 28, 1877.

WITNESSES:

C Clarence Poole

Geo H. Evans

INVENTOR:

Sarah M. Rennie per attyp. A. W. Evans Jr.

N. PETERS, PHOTO-LITHOGRAPHER, WASHINGTON, D. C.

UNITED STATES PATENT OFFICE.

SARAH M. RENNIE, OF BINGHAMTON, NEW YORK, ASSIGNOR OF ONE-HALF INTEREST TO WM. J. RENNIE, OF SAME PLACE.

IMPROVEMENT IN DUST-PANS.

Specification forming part of Letters Patent No. 191,368, dated May 29, 1877; Reissue No. 7,866, dated August 28, 1877; application filed August 16, 1877.

*To all whom it may concern:*

Be it known that I, SARAH M. RENNIE, of Binghamton, in the county of Broome and State of New York, have invented certain Improvements in Receptacles for Sweepings of Stairs and Floors of Apartments, which improvements are fully set forth in the following specification, reference being had to the accompanying drawings, in which—

Figure 1:
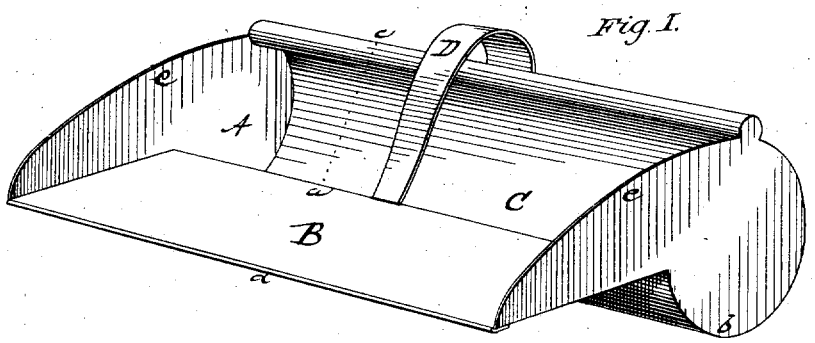
Figure 2:
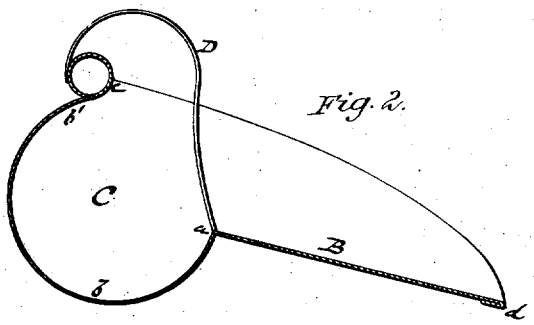
Figure 3:
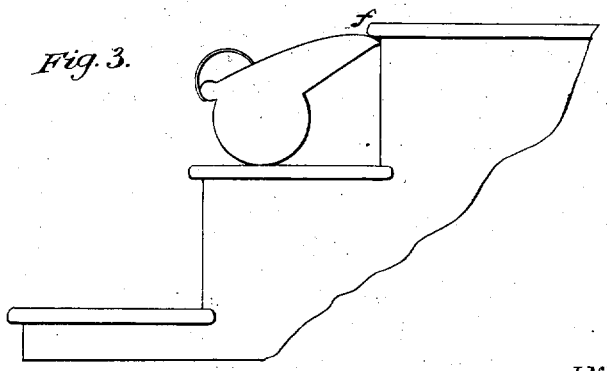

Figure 1 is a view of a device embodying my invention. Fig. 2 is an end view of a sectional elevation of the same, showing the recess and lip. Fig. 3 is an end view of the device in position on the stairs for the reception of the sweepings from the step above.

My invention consists in the peculiar construction and arrangement of parts, and will be hereinafter more specifically pointed out in the claim.

In the drawings, A is the dust-pan, which is made of a larger size than the ordinary article, say two feet in length, more or less, that it may receive the entire sweepings of the apartment, and that its weight may retain it in position. B is the projecting lip or apron, the edge of which rests on the floor, on the carpet, or under the projecting edge *f* of the step of the stairs. The outer edge of this lip is stiffened by bending the metal back on itself and producing several thicknesses, which are pressed closely together. This mode of stiffening avoids the use of the ordinary wire stiffener, which thickens the edge of the lip too much to receive readily the sweepings. The other point of bearing is the depression *b* of the recess C. This recess has a depth below the level of the apron B sufficient to hold the sweepings, while the upper curve *b'* passes above the recess and shuts in the dust by producing an eddy in the air, which strikes the curved rear portion of the pan at a point below its center and, following the upward and forward curve, is formed into an eddy within the recess C, and prevents the escape of the dust into the room. This has heretofore been accomplished by an arrangement of lids and springs attached to the dust-pan, more or less complicated and costly.

I am aware that dust-pans have been made with a circular recess having a depth below the level of the apron sufficient to hold the sweepings, but these have not been provided with a curved portion covering the recess sufficiently to arrest the dust and prevent its rising in the room.

D is the handle, which is attached to the upper edge of the opening *c* of the recess, and to the center of the lip B, on a line *a*. This forms a brace for the protection of the edge of the recess.

The opening *c* is shown by a dotted line from *a* to *c*.

The outside of the device is left free from the ordinary attachments.

When I use my dust-pan for sweeping stairs, I place it in position, as shown by Fig. 3 in the drawings; and when used for the floor or carpet, I move it from one position to another with the foot, until the work is accomplished.

What I claim as new, and desire to secure by Letters Patent, is—

As an improved article of manufacture, a dust-pan, constructed as described, and consisting of the lip or apron B, the recess C, and the curved protector *b'*, substantially as and for the purpose set forth.

SARAH M. RENNIE.

Witnesses:

WILLIAM J. RENNIE,
P. P. ROGERS.